United States Patent
McMahan

(10) Patent No.: US 7,549,278 B2
(45) Date of Patent: Jun. 23, 2009

(54) TRIMMER SYSTEM FOR A LAWN MOWER AND METHOD OF USE

(76) Inventor: Ricky T. McMahan, 153 Hobson Branch Rd., Weaverville, NC (US) 28787

( * ) Notice: Subject to any disclaimer, the term of this patent is extended or adjusted under 35 U.S.C. 154(b) by 9 days.

(21) Appl. No.: 11/637,480

(22) Filed: Dec. 11, 2006

(65) Prior Publication Data
US 2007/0130901 A1    Jun. 14, 2007

Related U.S. Application Data

(60) Provisional application No. 60/748,722, filed on Dec. 9, 2005.

(51) Int. Cl.
*A01D 34/00* (2006.01)
(52) U.S. Cl. ...................................... 56/13.7
(58) Field of Classification Search ................. 56/13.7, 56/17.4, 10.4, 11.8, 11.6, 16.9, 12.7
See application file for complete search history.

(56) References Cited

U.S. PATENT DOCUMENTS

| | | | | | |
|---|---|---|---|---|---|
| 2,960,811 | A | * | 11/1960 | Roesel | 56/10.4 |
| 3,191,368 | A | * | 6/1965 | Hidalgo | 56/17.4 |
| 3,236,037 | A | * | 2/1966 | Porterfield | 56/13.7 |
| 3,490,213 | A | * | 1/1970 | Pinto | 56/16.9 |
| 3,526,083 | A | * | 9/1970 | Watson et al. | 56/10.7 |
| 3,531,922 | A | * | 10/1970 | Hansen | 56/13.7 |
| 4,104,851 | A | * | 8/1978 | Perry | 56/10.4 |
| 4,170,099 | A | | 10/1979 | Owens | |
| 4,642,976 | A | | 2/1987 | Owens | |
| 4,896,488 | A | | 1/1990 | Duncan et al. | |
| 5,035,107 | A | * | 7/1991 | Scarborough | 56/10.4 |
| 5,167,108 | A | | 12/1992 | Bird | |
| 5,226,284 | A | * | 7/1993 | Meehleder | 56/11.6 |
| 5,471,824 | A | * | 12/1995 | Neely | 56/10.4 |
| 5,598,689 | A | | 2/1997 | Bork | |
| 6,474,053 | B1 | * | 11/2002 | Lund | 56/13.7 |
| 6,546,706 | B1 | | 4/2003 | Nafziger | |
| 2006/0021314 | A1 | | 2/2006 | Hatfield | |

OTHER PUBLICATIONS

"Peco New Z Trimmer" advertising sheets; Jan. 5, 2005; Peco, Inc.; Arden, NC.

* cited by examiner

*Primary Examiner*—Árpád Fábián-Kovács
(74) *Attorney, Agent, or Firm*—Carter & Schnedler, PA

(57) ABSTRACT

A trimmer system for a lawn mower including a base plate attached to a deck of a lawn mower with a fastener, the base plate defining slots for receiving the fastener and enabling the base plate to be slid along a range of travel including a fully stowed position and a fully extended position, a trimmer shaft mounted on the base plate, and a trimmer head configured to be received by the trimmer shaft.

5 Claims, 5 Drawing Sheets

TRIMMER SYSTEM FOR A LAWN MOWER AND METHOD OF USE

CROSS-REFERENCE TO RELATED APPLICATIONS

This United States nonprovisional patent application relates to, claims the benefit of the filing date of, and otherwise claims priority to U.S. provisional patent application Ser. No. 60/748,722, filed in the United States Patent & Trademark Office on Dec. 9, 2005.

DETAILED DESCRIPTION

Figure 1:
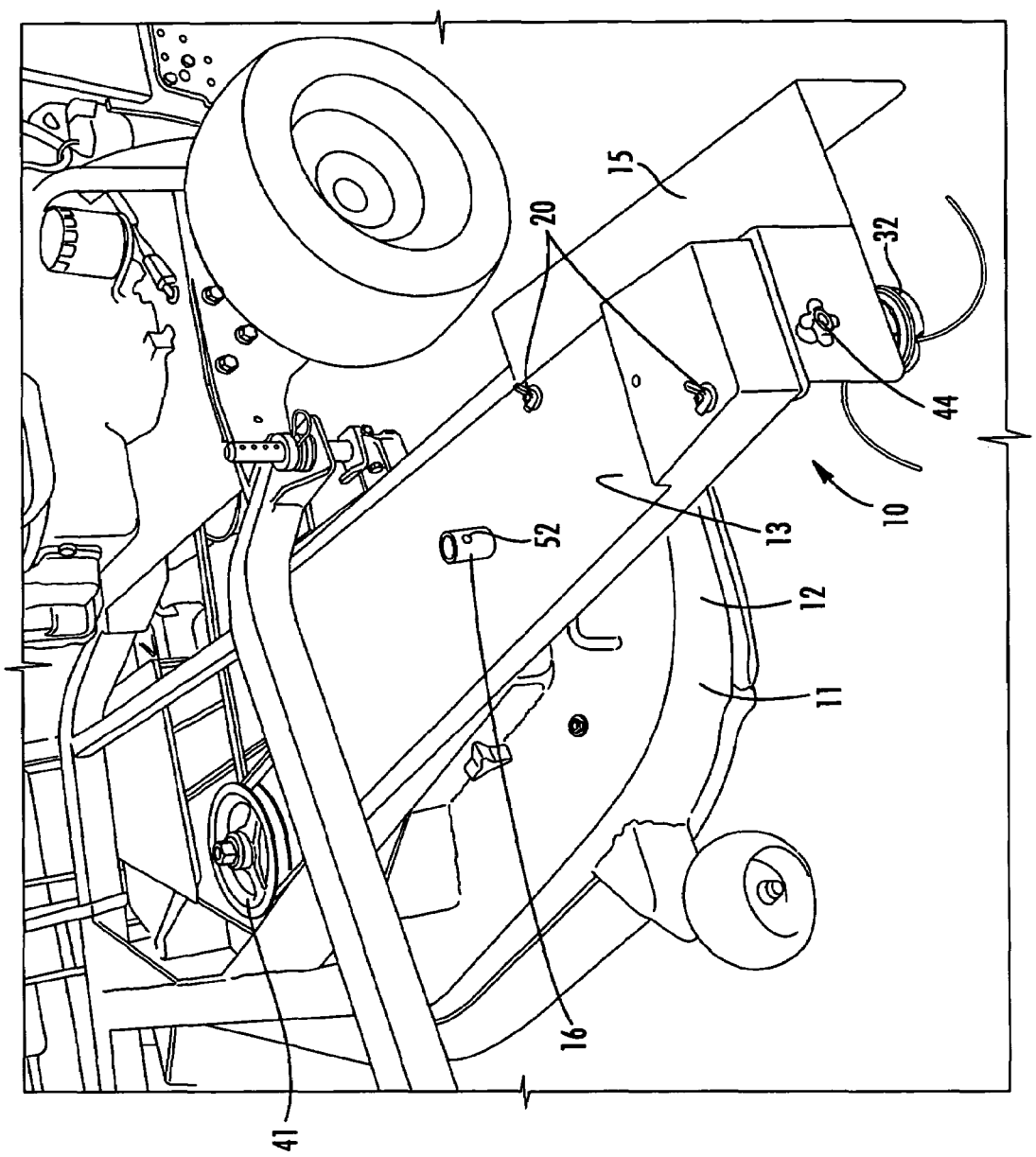
FIG. 1 is a fragmentary perspective view of an embodiment of the invention in a fully extended position on a lawn mower.

A trimmer system for a lawn mower is shown broadly at reference numeral 10 in FIG. 1 as installed on a lawn mower 11. Although a commercial lawn mower is shown in the drawings, the invention, including but not limited to the disclosed embodiment thereof, could also be employed in conjunction with a residential lawn mower.

Figure 5:
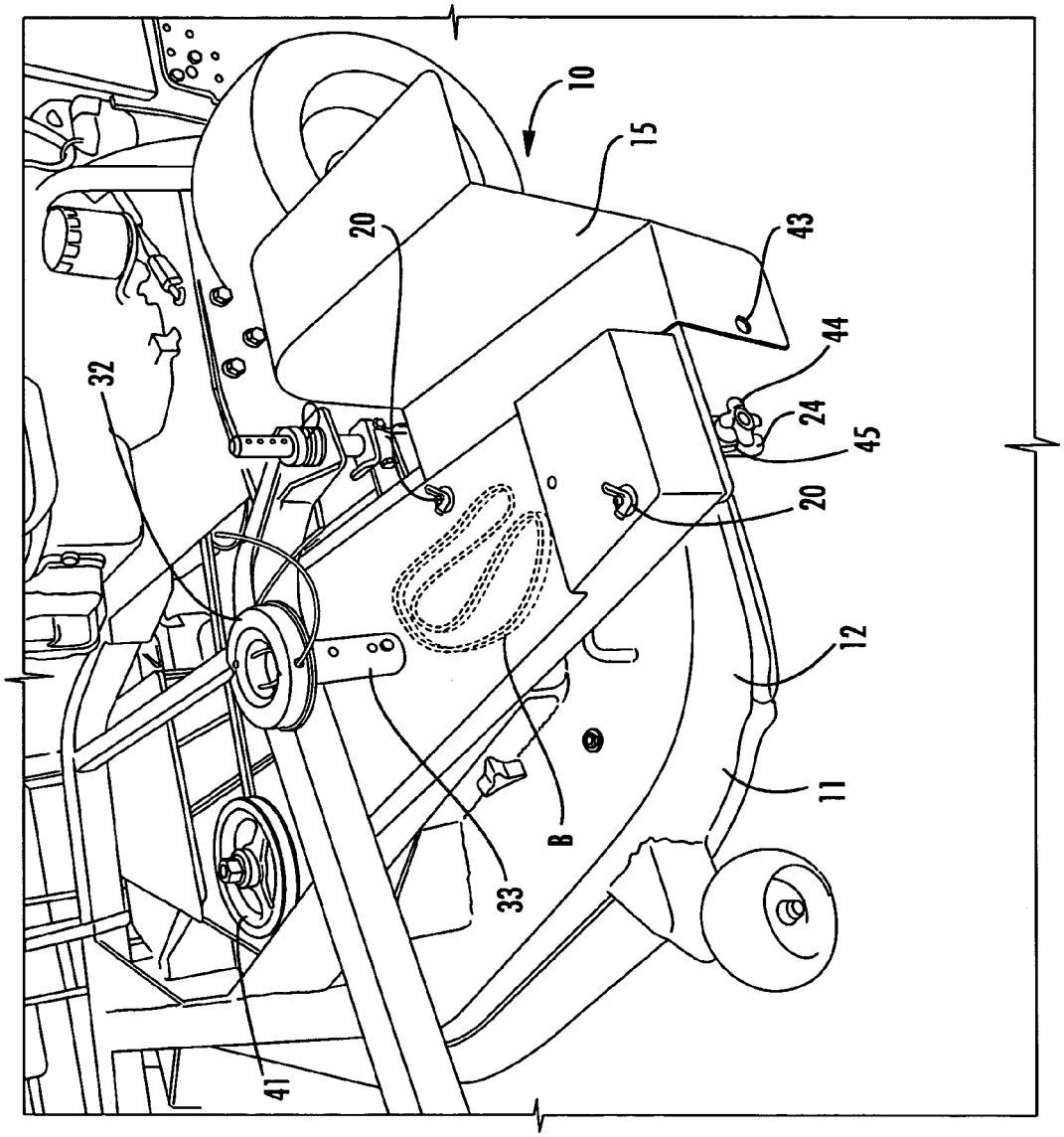
FIG. 5 is a fragmentary perspective view of the embodiment shown in FIGS. 1 and 2 in a fully stowed position with the belt stored under the housing and the trimmer stored on the trimmer storage spindle.

The trimmer system 10 is shown installed on a deck 12 of the lawn mower 11. The trimmer system 10 comprises a belt housing 13, a base plate 14 (FIG. 2), and a shield 15. The belt housing 13 is attached to the base plate 14 by two wing nuts 20 (FIG. 1), each of which is screwed onto a fastener such as a bolt 21 (FIG. 2) carried by a bolt spacer 22 (FIG. 2), the bolt spacer 22 being attached to the base plate 14. When attached to the base plate 14, the belt housing 13 also rests on a support post 23 attached to the base plate 14. A trimmer shaft 24 extends through the base plate 14. The trimmer shaft 24 comprises a pulley-receiving portion 25 above the base plate 14 and a trimmer-head-receiving portion 30 (FIG. 3) below the base plate 14. A flange bearing (not shown) is installed in the base plate 14 to carry the trimmer shaft 24 and to facilitate rotation of the trimmer shaft 24. A trimmer pulley 31 is mounted on the pulley-receiving portion 25 of the trimmer shaft 24. A trimmer head assembly 36 (FIG. 3) may be mounted on the trimmer-head-receiving portion 30 of the trimmer shaft 24 as desired. The trimmer head assembly 36 comprises a trimmer head 32 and a trimmer shaft collar 33 mounted thereon. The trimmer head 32 may be any one of a number of standard string trimmer heads known to those of ordinary skill in the art. The trimmer shaft collar 33 receives the trimmer-head-receiving portion 30 of the trimmer shaft 24. When the trimmer system 10 is not in use, the trimmer head assembly 36 may be stored on a trimmer head storage spindle 16 (FIG. 1) attached to the belt housing 13, as shown in FIG. 5.

The base plate 14 is attached to the deck 12 of the lawn mower 11 with four wing nuts 34 screwed onto fasteners such as bolts 35 mounted on the deck 12. The bolts 35 are arranged in two pairs, each bolt pair positioned along one of two substantially parallel, spaced-apart bolt axes. These two bolt axes are substantially parallel to the longitudinal axis of the base plate 14. The base plate 14 defines two substantially parallel, spaced-apart slots 40, one along each of the bolt axes to receive one of the bolt pairs. The slots 40 defined by the base plate 14 enable the base plate 14, and therefore the trimmer system 10 as a whole, to be slid along a range of travel from a fully extended position (FIGS. 1 and 2) to a fully stowed position (FIG. 5), as desired, or to any other position along the range of travel.

The trimmer pulley 31 is one of the components of a power takeoff (PTO) system. The PTO system further comprises a drive pulley 41 mounted on a deck shaft (not shown) that extends through the deck 12, is rotated by other components (not shown) of the lawn mower 11, and rotates blades (not shown) of the lawn mower 11, as known by those of ordinary skill in the art. The PTO system further comprises a belt "B" that, when the trimmer system 10 is in use, extends between and is carried on the trimmer pulley 31 and the drive pulley 41 to transmit the rotational force of the drive pulley 41 to the trimmer pulley 31, thereby causing the trimmer shaft 24 and the trimmer head 32 mounted thereon to rotate. A belt guide (not shown) may be mounted on the deck 12 adjacent to the drive pulley 41 to help ensure retention of the belt "B" on the drive pulley 41 during use of the trimmer system 10. When the trimmer system 10 is in the fully extended position (FIGS. 1 and 2), the base plate 14 is extended such that sufficient tension is on the belt "B" to transmit the rotational force of the drive pulley 41 to the trimmer pulley 31. The trimmer and drive pulley 31, 41 are sized according to the desired speed of the trimmer head 32, for instance in revolutions per minute (RPM); if it is desired for the trimmer head 32 to rotate at twice the RPM of the drive pulley 41, the trimmer pulley 31 may be one-half (½) the size of the drive pulley 41. A typical speed of the trimmer shaft 24 when this 2:1 ratio is employed is 7000 RPM, which is twice the speed of the blades of a typical lawn mower, as known by those of ordinary skill in the art.

Figure 2:
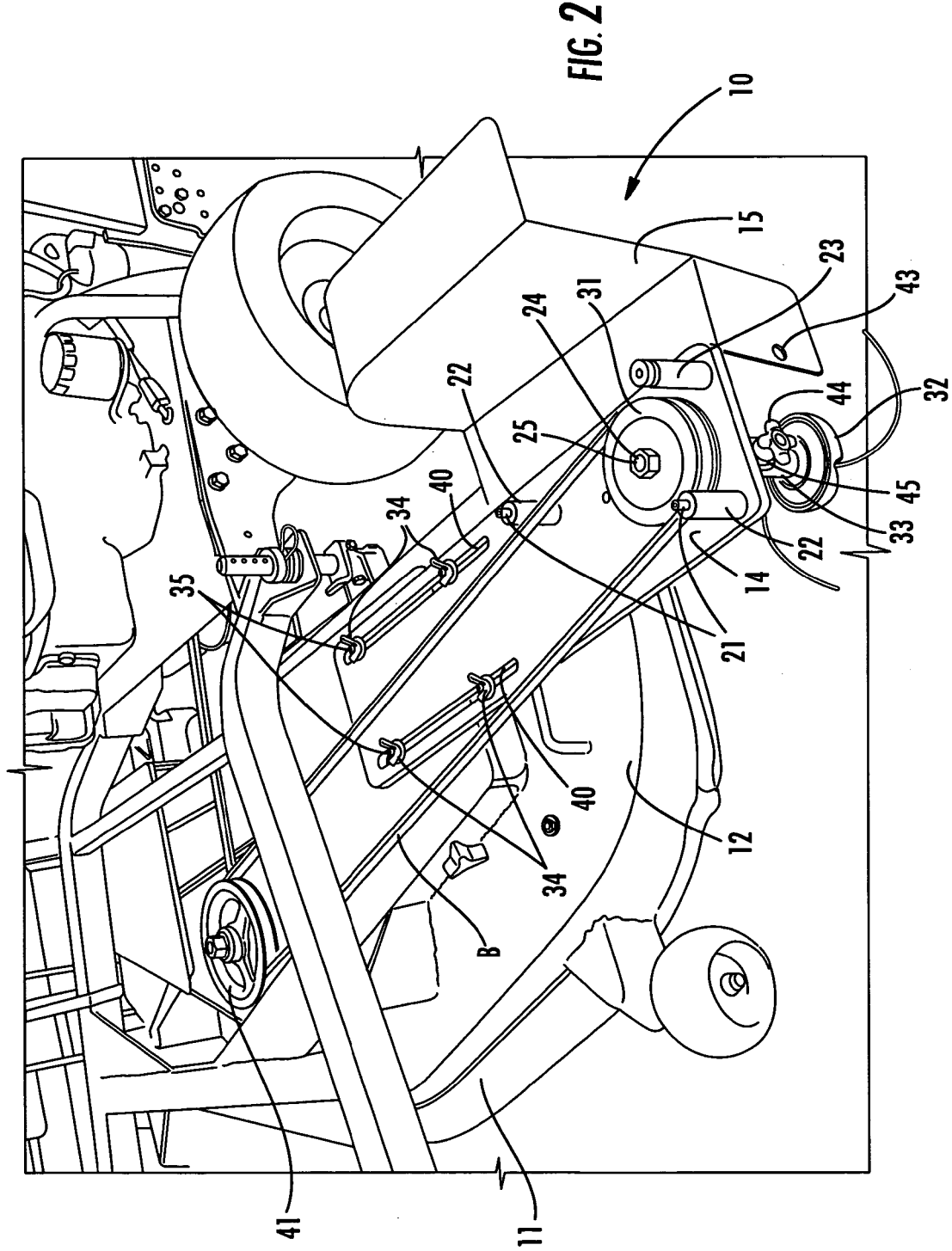
FIG. 2 is a fragmentary perspective view of the embodiment shown in FIG. 1, but with the housing removed and the shield in an open position.
Figure 3:
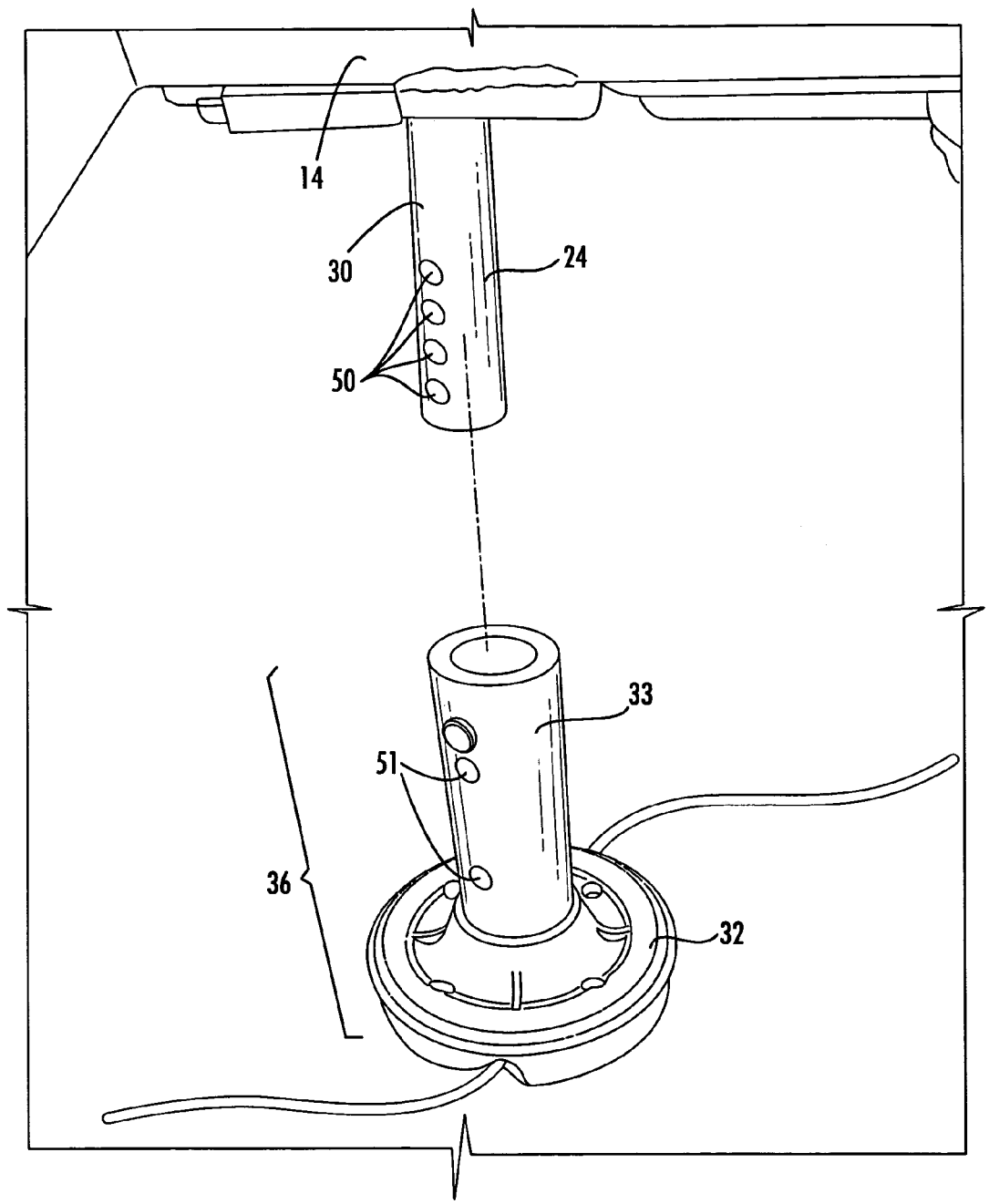
FIG. 3 is an exploded view of the trimmer and the trimmer shaft of the embodiment shown in FIGS. 1 and 2.
Figure 4:
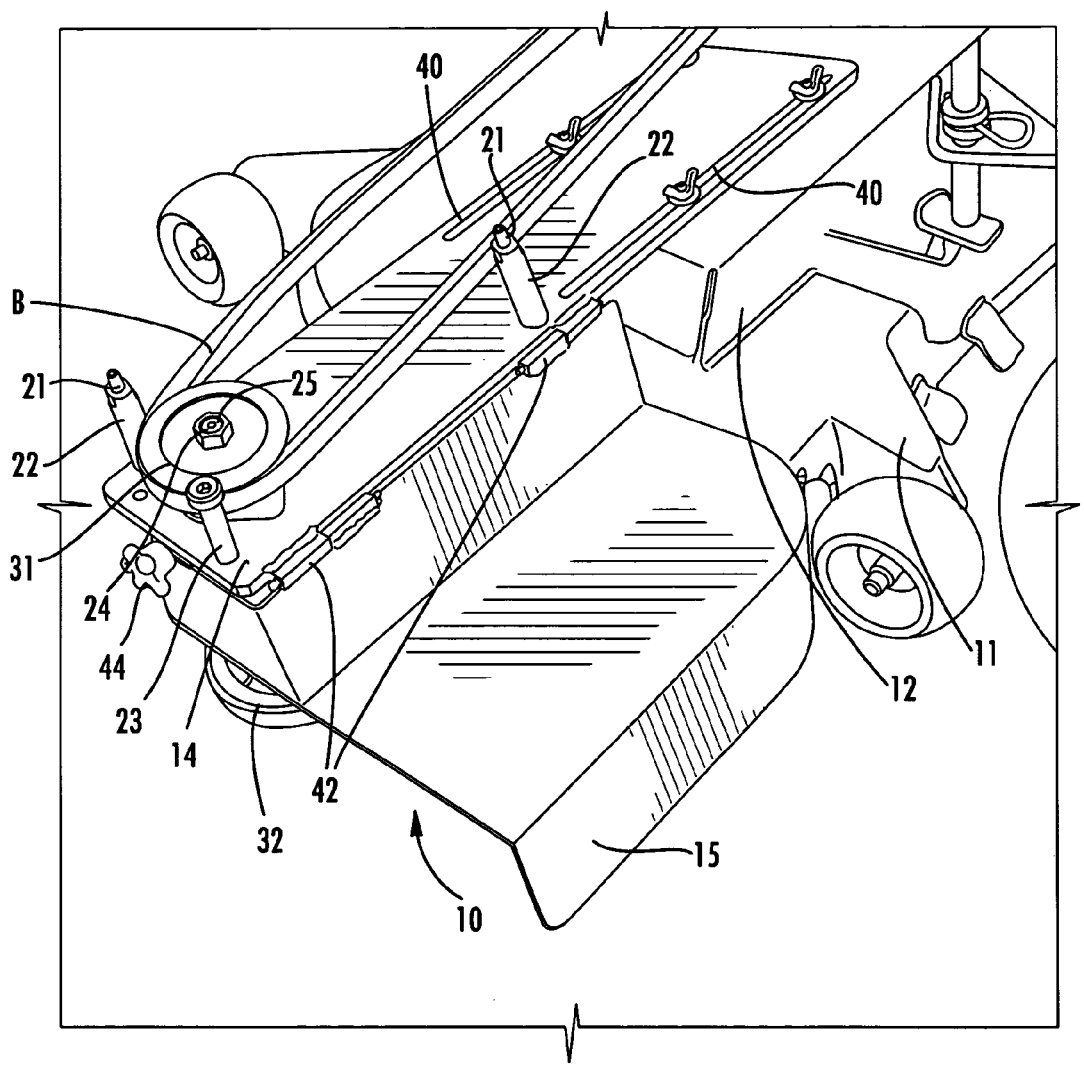
FIG. 4 is a fragmentary perspective view of the embodiment shown in FIGS. 1 and 2, showing the shield of the embodiment in a closed position.

The shield 15 (FIG. 4) is mounted on the base plate 14 with spring-loaded hinges 42 that maintain the shield 15 in a closed position, as shown in FIGS. 1 and 4. The shield 15 may be maintained in an open position as shown in FIGS. 2 and 5 only if a bungee cord (not shown) or other means is employed to overcome the closing force imparted by the hinges 42. The shield 15 defines a port 43 (FIGS. 2 and 5) for receiving a retention bolt (not shown) when the shield 15 is in the closed position. A knob 44 carries the retention bolt such that a user may more easily screw and unscrew the retention bolt as desired and such that the shield 15 is prevented from slipping off the retention bolt during use of the trimmer system 10. The retention bolt mates with a threaded port (not shown) defined by a tab 45 attached to the base plate 14.

The trimmer-head-receiving portion 30 of the trimmer shaft 24 defines multiple ports 50 for receiving a hitch pin (not shown). The user may select the trimmer shaft port 50 that best corresponds to a position of the trimmer head 32 that will enable the material to be trimmed (grass, brush, etc.) to a desired height. After the desired trimmer shaft port 50 is selected, a port 51 defined by the trimmer shaft collar 33 is aligned with the desired trimmer shaft port 50. The hitch pin is then inserted through the trimmer shaft collar port 51, through the desired trimmer shaft port 50, and through a trailing port (not shown) defined by the trimmer shaft collar 33 such that the hitch pin extends through the outer diameters of the trimmer shaft collar 33 and the trimmer-head-receiving portion 30 of the trimmer shaft 24 to secure the trimmer shaft 24 in the trimmer shaft collar 33. Similarly, when the trimmer system 10 is not in use and the trimmer head assembly 36 is stored, a hitch pin (not shown) is inserted through a port 52 defined by the trimmer head storage spindle 16 (FIG. 1), through the trimmer shaft collar port 51 that aligns with the trimmer head storage spindle port 52, and through a trailing port (not shown) defined by the trimmer head storage spindle 16 such that the hitch pin extends through the outer diameters of the trimmer shaft collar 33 and the trimmer head storage spindle 16 to secure the trimmer head storage spindle 16 in the trimmer shaft collar 33.

As shown in FIG. 5, the belt "B" may be stored under the belt housing 13 and on the base plate 14 (FIG. 2) when the trimmer system 10 is not in use, i.e., when the base plate 14 has been slid into the fully stowed position or another position that enables removal of the belt "B" from the trimmer and drive pulleys 31, 41.

In the illustrated embodiment, the base plate 14 and the trimmer shaft 24 are both made from 1018 cold-rolled steel, the bolts 35 are 5/16"-18 UNC hex-head bolts, and the belt housing 13 and the shield 15 are fabricated from commercial quality cold-rolled sheet steel. The nuts, the bolts, and the flange bearing are commercial items available through an industrial supply vendor, as known by those of ordinary skill in the art.

The trimmer system 10 may be used by sliding the base plate 14 into the fully extended position, ensuring that the belt "B" is positioned to engage the drive pulley 41 and the trimmer pulley 31, ensuring that the trimmer head assembly 36 is mounted on the trimmer shaft 24 (for instance, by ensuring that the trimmer head assembly 36 is removed from the trimmer storage spindle 16 and mounted on the trimmer shaft 24), and actuating the trimmer shaft 24 by actuating the drive pulley 14 after the belt "B" is engaging the drive pulley 41 and the trimmer pulley 31.

A trimmer system for a lawn mower and method of use is described above. Various details of the invention may be changed without departing from its scope. Furthermore, the foregoing description of an embodiment of the invention are provided for the purpose of illustration only and not for the purpose of limitation—the invention being defined by the claims.

What is claimed is:

1. A trimmer system for a lawn mower, comprising:
   a base plate attached to a deck of the lawn mower;
   a trimmer shaft mounted on the base plate and extending from a pulley-receiving portion vertically downwardly to a trimmer-head-receiving portion;
   a trimmer head assembly including a trimmer shaft collar configured to be mounted on the trimmer-head-receiving portion of the trimmer shaft for rotation on a vertical axis during operation; and
   a power takeoff system including a drive pulley mounted on a shaft carried by and extending above the deck, a trimmer pulley mounted on the pulley-receiving portion of the trimmer shaft, and a belt located above the deck engaging the drive pulley and the trimmer pulley to transmit rotation of the drive pulley to the trimmer pulley;
   the base plate being attached to the deck with a fastener, the base plate defining slots for receiving the fastener and enabling the base plate to be slid along a range of travel comprising a fully stowed position and a fully extended position.

2. The trimmer system of claim 1, further comprising a belt housing attached to the base plate and a trimmer storage spindle mounted on the belt housing and configured to receive the trimmer shaft collar of the trimmer head assembly when the trimmer head assembly is not mounted on the trimmer-head-receiving portion of the trimmer shaft.

3. The trimmer system of claim 1, the longitudinal axis of the range of travel of the base plate being substantially parallel to the longitudinal axis of the deck.

4. The trimmer system of claim 1, further comprising a belt housing attached to the base plate and covering the trimmer pulley.

5. The trimmer system of claim 4, wherein the belt housing and the base plate being configured for storage of the belt under the belt housing and on top of the base plate when the trimmer system is not in use.

* * * * *